United States Patent Office 3,796,744

Patented Mar. 12, 1974

3,796,744

ACRYLOYLOXYALKYL ALKYLOXYSTILBENE-CARBAMATES

Durvasula V. Rao, Cheshire, Henri Ulrich, Northford, and Fred A. Stuber and Adnan A. R. Sayigh, New Haven, Conn., assignors to The Upjohn Company, Kalamazoo, Mich.

No Drawing. Application Feb. 1, 1971, Ser. No. 111,692, now Patent No. 3,718,692, which is a division of application Ser. No. 864,218, Oct. 6, 1969, now Patent No. 3,583,940. Divided and this application Dec. 26, 1972, Ser. No. 317,958

Int. Cl. C07c *125/06*

U.S. Cl. 260—471 C 2 Claims

ABSTRACT OF THE DISCLOSURE

Stilbenes of the formula

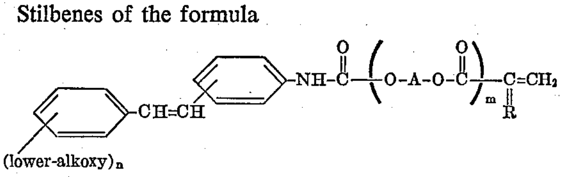

wherein *n* is an integer from 1 to 3, *m* is an integer from 0 to 1, A is lower-alkylene and R is hydrogen or lower-alkyl, are disclosed, as well as homopolymers of said compounds, and copolymers of said compounds with monomers containing a polymerizable $CH_2=C<$. The above stilbenes and the polymers derived therefrom are photosensitive and can be used in the preparation of photoresist systems.

CROSS-REFERENCE TO RELATED APPLICATION

This application is a division of copending application Ser. No. 111,692, filed Feb. 1, 1971, now U.S. Pat. No. 3,718,692, which in turn is a division of Ser. No. 864,218, filed Oct. 6, 1969, now U.S. Pat. No. 3,583,940.

BACKGROUND OF THE INVENTION

(1) Field of the invention

This invention relates to novel stilbene derivatives and to methods for their preparation and is more particularly concerned with polymerizable N-acryloylaminostilbenes, with photosensitive polymers produced therefrom, and with photoresist systems derived from said polymers.

(2) Description of the prior art

While the preparation of photosensitive polymers and the use thereof in the preparation of photoresist systems is becoming well established in the art, see, for example, U.S. Pat. 2,948,706, the monomeric stilbenes and the polymers derived therefrom, which are described herein, are believed to be novel.

SUMMARY OF THE INVENTION

This invention comprises (a) monomeric stilbenes having the formula

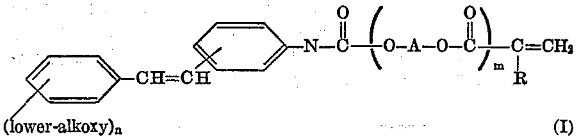

(I)

wherein *n* is an integer from 1 to 3, *m* is an integer from 0 to 1, A is lower-alkylene, and R is selected from the class consisting of hydrogen and lower-alkyl;

(b) homopolymers derived from the monomeric stilbenes of the Formula I; and (c) copolymers derived by copolymerizing a monomeric stilbene of the Formula I with a monomer containing a polymerizable $CH_2=C<$.

The invention also comprises photoresist systems which contain a polymer defined under (b) or (c) above.

The term "lower-alkylene" as used means alkylene of from 2 to 6 carbon atoms, inclusive, such as ethylene, 1,3-propylene, 1,2-propylene, 2,3-butylene, 1,4-butylene, 1,2-pentylene, 1,3-hexylene, 1,6-hexylene, and the like. The term "lower-alkyl" as used herein means alkyl from 1 to 6 carbon atoms, inclusive, such as methyl, ethyl, propyl, butyl, pentyl, hexyl, and isomeric forms thereof. The term "lower-alkoxy" as used herein means alkoxy from 1 to 6 carbon atoms, inclusive, such as methoxy, ethoxy, propoxy, butoxy, pentyloxy, hexyloxy and isomeric forms thereof.

The term "monomer containing a polymerizable $CH_2=C<$" defines a class of compounds containing vinyl groups, which class is well recognized in the art. Illustrative of such monomers are lower-alkyl acrylates such as methyl, ethyl, butyl and isobutyl acrylates; lower-alkyl methacrylates such as methyl, ethyl, isopropyl and amyl acrylates; lower-alkyl vinyl ethers such as methyl vinyl ether and butyl vinyl ether; acrylonitrile; styrene; acrylamide; vinylcarbazole and the like.

It is to be noted that the stilbenes (I) can exist in both cis and trans forms. These stereoconfigurations are retained in the homopolymers and copolymers of the invention which are derived from the stilbenes (I). These various stereochemical forms of the monomers and the polymers are all within the scope of the present invention.

The monomeric stilbenes of Formula I, and the homo- and copolymers (b) and (c) which are derived therefrom are all light sensitive and can be polymerized, or further polymerized and/or cross-linked, on exposure to radiation within the ultraviolet region. This makes the various compounds of the invention useful in photoresist systems as will be described in more detail hereinafter.

DETAILED DESCRIPTION OF THE INVENTION

The monomeric stilbenes of Formula I can be prepared readily. Thus, the compounds of Formula I in which *m* is zero, i.e. the stilbenes of the following structure:

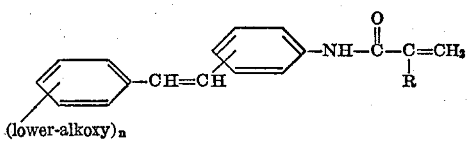

wherein R and *n* have the significance above defined can be prepared readily by reaction of the corresponding stilbene amines of the formula:

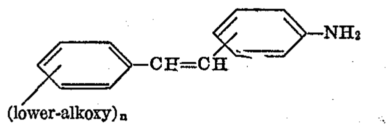

(II)

wherein *n* is as hereinbefore defined, with the appropriate acid halide $$CH_2=\underset{\displaystyle R}{\underset{|}{C}}-COHal$$

wherein Hal is chlorine or bromine, under conditions well recognized in the art for the preparation of amides by reaction of acid halides with amines. Illustratively, the acid halide and the stilbene amine are brought together in approximately stoichiometric proportions, advantageously in the presence of an inert organic solvent such as benzene, toluene, xylene, diethyl ether, tetrahydrofuran, dioxane and the like. Preferably the reaction is conducted in the presence of a tertiary amine such as triethylamine or pyridine which can also serve as solvent for the reaction. If desired, the temperature of the reaction mixture can be elevated and temperatures up to 100° C. or higher can be used but, in general, the reaction proceeds very smoothly at or about 20 to 30° C. The required amide can be separated from the reaction product by procedures conventional in the art. For example the reaction product can be washed with water and aqueous alkali and the required amide separated from the organic layer by evaporation of solvent, if present, followed by purification by conventional techniques such as recrystallization in the case of solids, and distillation in the case of liquids.

Similarly the compounds of Formula I in which $m$ is 1, i.e. the stilbenes of the following structure:

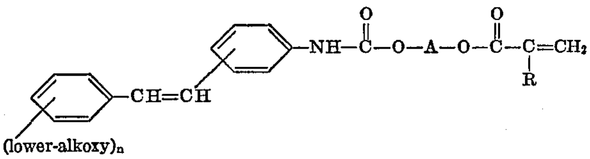

wherein R, $n$ and A have the significance above defined, can be prepared readily by reaction of the corresponding stilbene isocyanate of the formula:

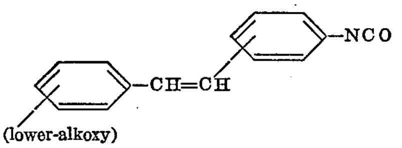

(III)

wherein $n$ is as hereinbefore defined, with the appropriate hydroxyalkyl ester

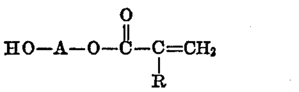

wherein A and R are as hereinbefore defined. The reaction is conducted under conditions well known in the art for the preparation of carbamates from isocyanates and alcohols. Illustratively, the reactants are brought together in approximately stoichiometric proportions advantageously in the presence of an inert solvent, i.e. an organic solvent which does not enter into reaction with either of the reactants or otherwise interfere with the desired course of the reaction. Examples of inert organic solvents are benzene, toluene, xylene, tetrahydronaphthalene, decahydronaphthalene, chlorobenzene, dichlorobenzene, tetrahydrofuran, dioxane, dimethylsulfoxide, diethylene glycol dimethyl ether, diethyl ether, N,N-dimethylformamide, hexamethylphosphoramide, ethyl acetate, Cellosolve acetate, and the like.

The reaction between the stilbene isocyanate (III) and the hydroxyalkylester is preferably conducted at elevated temperatures i.e. at a temperature within the range of about 50° C. to about 200° C. Lower temperatures, of the order of about 25° C., can be employed if speed of reaction is not critical consideration. The reaction is also advantageously carried out in the presence of a catalyst. Any of the catalysts which are known in the art to be useful in the catalysis of reaction between an isocyanato group and a hydroxyl group can be used for this purpose; see, for example, Saunders et al., Polyurethanes, Chemistry and Technology, part I, pp. 228–230, Interscience Publishers, New York, 1964; see also Burkus, Journal of Organic Chemistry, 26, pp. 779–782, 1961. Such catalysts include organic and inorganic salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, zirconium, as well as phosphines and organic tertiary amines. Representative organotin catalysts are stannous octoate, stannous oleate, dibutyltin dioctoate, dibutyltin dilaurate, and the like. Representative organic amine catalysts are triethylamine, triethylenediamine, N,N,N′,N′-tetraethylethylenediamine,
N,N,N′,N′-tetramethylethylenediamine,
N-methylmorpholine,
N-ethylmorpholine,
N,N,N′,N′-tetramethylguanidine,
N,N,N′,N′-tetramethyl-1,3-butanediamine,
N,N-dimethylethanolamine,
N,N-diethylethanolamine, and the like.

The desired reaction product (I; $m=1$) can be isolated from the reaction mixtures by conventional procedures, for example, by evaporation of the inert organic solvent followed by purification of the residue as by chromatography, by recrystallization in the case of solids or by distillation in the case of liquids.

The stilbene isocyanates (III) which are employed as starting materials in the above-described process, are prepared conveniently by phosgenation of the corresponding stilbene amines (II), which also are employed as starting materials in preparing the compounds of the invention. The phosgenation is carried out using procedures routinely employed in the phosgenation of aromatic amines to the corresponding isocyanates; see, for example, the procedures described by Siefken, Annalen, 562, 75 et seq., 1949.

The stilbene amines (II) are themselves prepared from the corresponding nitrostilbenes using reaction conditions conventional in the art for the reaction of aromatic nitro compounds without simultaneous reduction of the olefinic double bond present in the molecule. Illustrative of said reduction conditions are the use of (a) stannous chloride in the presence of hydrochloric acid under conditions described, for example, by Peck et al., Journal American Chemical Society, 74, 468, 1952, for the reduction of 4-dimethylamino-4′-nitrostilbene to 4-dimethylamino-4′-aminostilbene, (b) aqueous ferrous sulfate in the presence of ammonium hydroxide, (c) Raney nickel, (d) titanous chloride or titanous sulfate in the presence of hydrochloric or sulfuric acid, respectively, and (e) metallic tin, zinc, or iron in the presence of hydrochloric acid.

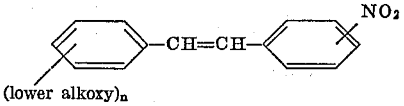

(IV)

wherein lower-alkoxy and $n$ are as hereinbefore defined. The nitrostilbenes (IV) can exist in both cis- and trans-forms as well as mixtures thereof, and, upon reduction, give rise to the corresponding aminostilbenes (II) in cis- or trans- forms or mixtures thereof.

The nitrostilbenes (IV) can themselves be prepared by conventional procedures. For example, the nitrostilbenes (IV) can be prepared by condensing the corresponding lower-alkoxybenzaldehyde with the appropriate 2-, 3- or 4-nitrotoluene or the appropriate 2-, 3- or 4-nitrophenylacetic acid. Said condensation is generally carried out in the presence of a catalyst such as a secondary amine, for example, piperidine. The condensation of the appropriate lower-alkoxybenzaldehyde and the nitrotoluene can be carried out illustratively under the conditions described by Peck et al., supra. The condensation of the appropriate lower-alkoxybenzaldehyde and the nitrophenylacetic acid generally occurs with intermediate formation of the corresponding cinnamic acid of the formula:

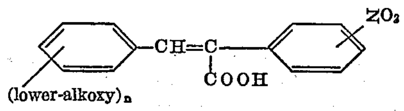

where lower-alkoxy and $n$ have the significance hereinbefore defined. Said cinnamic acid can be isolated and subsequently decarboxylated in situ by carrying out the final stages of the condensation of aldehyde and nitrophenylacetic acid at temperatures above that at which decarboxylation commences. Typical of the latter procedures is that described by Kaufman, Berichte, 54, 795, 1921. Where piperidine is employed as catalyst, this latter procedure generally gives rise exclusively to the trans-isomer of the desired nitrostilbene (IV). The method in which the intermediate cinnamic acid is isolated prior to decarboxylation has the advantage that it enables either the cis- or trans-isomer of the desired nitrostilbene (IV) to be isolated by suitable choice of decarboxylation conditions. As shown by Ulrich et al., Journal Organic Chemistry, 31, 4146, 1966, decarboxylation of the above cinnamic acid by heating in inert organic solvents such as benzene, toluene, and the like, in the presence of piperidine or morpholine gives rise to the trans-isomer of the nitrostilbene (IV). Decarboxylation of the above cinnamic acid in the presence of copper chromite in quinoline solution yields the cis-isomer of the corresponding nitrostilbene (IV).

The lower-alkoxybenzaldehydes, nitrotoluenes and nitrophenylacetic acids employed as described above to prepare the nitrostilbenes (IV) can be prepared by general procedures well recognized in the art. Illustratively, methods for the preparation of the alkoxybenzaldehydes, nitrotoluenes, and nitrophenylacetic acids are summarized at pp. 507 et seq., pp. 135 et seq., and pp. 593 et seq., respectively, of Chemistry of Carbon Compounds, edited by E. H. Rodd, vol. IIIA, Elsevier, New York, 1954.

The preparation of the isocyanatostilbenes (III), and of the aminostilbenes (II) employed as starting materials in the process of the invention, is further illustrated and exemplified by preparations 1–5 set forth hereinafter.

The novel monomeric stilbenes (I) of the invention can be homopolymerized, or copolymerized with one or more monomers containing a polymerizable $CH_2=C<$, to produce light-sensitive polymers, which are novel and highly useful as will be described in more detail hereinafter. The polymerization is carried out readily using a polymerization initiator under conditions well known in the art. Illustratively, the polymerization is conducted conveniently by mixing the monomer (I), or a mixture of monomer (I) and one or more monomers with a polymerizable $CH_2=C<$ as hereinbefore defined, under an inert atmosphere such as that provided by nitrogen, argon and like inert gases, adding a polymerization initiator, and heating the resulting mixture at the desired polymerization temperature until polymerization is complete. The polymerization initiators, also referred to as free radical sources, which are employed are those conventionally used in the art such as dimethyl peroxide, 2,2′-azobis(isobutyronitrile), benzoyl peroxide, tert.-butyl hydroperoxide, ascaridole, and the like. The initiator can be added in a single batch at the beginning of the polymerization but is preferably added portionwise at intervals during the course of polymerization.

The temperature at which the polymerization is conducted is advantageously within the range of about 40° C. to about 135° C. depending upon the particular initiator employed. As is well known in the art, the temperature at which any particular polymerization is carried out optionally is determined primarily by the half-life of the initiator. For example, the temperature at which polymerization is carried out is preferably in the range of about 60° C. to about 100° C. when benzoyl peroxide or 2,2′-azobis(isobutyronitrile) is employed as initiator whereas higher temperatures of the order of about 125° C. are preferable using initiators such as tert.-butyl hydroperoxide.

In the case of the preparation of copolymers of the invention it is preferred that the proportion of the monomeric stilbene (I) to other polymerizable monomers employed in making the copolymer be at least about 5 percent by weight and preferably be from about 10 percent to about 50 percent by weight of the total monomer mixture.

The polymers so obtained, i.e. the homopolymers and copolymers described above, are photosensitive materials and undergo further polymerization on exposure to radiation of a wavelength within the range of about 200 to 410 nm. This property of the novel polymers of the invention renders them particularly useful in the preparation of photoresist systems. For example, the polymers of the invention can be employed in the photographic reproduction and printing arts to produce printing masters as follows.

The polymer of the invention is dissolved in polar solvents such as tetrahydrofuran, acetone, ethyl acetate, Cellosolve, and the like, and is cast as a film on an appropriate substrate such as paper, metal, and like film supports normally employed in the reproduction art. A negative of the image to be reproduced, e.g. lined, screened, or half tone negatives or diapositives, is interposed between the supported film so obtained and a source capable of producing radiation within the wavelengths set forth above. The light-sensitive polymer in those portions of the supported film which receive the radiation is crosslinked by the action of the radiation and is thereby rendered insoluble. The amount of crosslinking produced at any given area of the supported film is directly related to the amount of radiation received thereat. After exposure of the supported film to the radiation, the polymer which has not received radiation and has accordingly not been crosslinked, is dissolved out by means of a solvent, leaving the cross-linked, insoluble, polymer on the surface of the film support in the form of a positive image corresponding to the negative used in the irradiation step. Said image is resistant to solvents, acids, alkalies, water, etc., as well as to abrasion, mechanical stresses, and the like, and hence possesses obvious advantages over images prepared by hitherto conventional reproduction processes.

In a similar manner the photoresist systems produced from the light-sensitive polymers of the invention can be used in other photoresist applications such as in the printing of microcircuitry and related application which involve production of an image, in the form of insoluble polymer, on a metal substrate such as copper, followed by removal, in part or in toto, of the uncoated metal by etching. Essentially the same technique as that described above is employed in the formation of the insoluble polymer image on the substrate.

The following preparations and examples describe the manner and process of making and using the invention and set forth the best mode contemplated by the inventors of carrying out the invention but are not to be construed as limiting.

PREPARATION 1

(A) Trans-2,5-dimethoxy-4′-aminostilbene

A solution of 70 g. of ferrous sulfate in 100 ml. of water was heated to the boiling point and stirred while a total of 100 ml. of aqueous 58 percent ammonium hydroxide and a solution of 5 g. of trans-2,5-dimethoxy-4′-nitrostilbene (Ulrich et al., supra) in 200 ml. of methanol were added simultaneously, as separate streams, over a period of 15 minutes. After the addition was complete, the resulting dark solution was heated with stirring at 65° C. to 70° C. for a further 2 hours. The product so obtained was heated on a steam bath to remove methanol and ammonia and the residue was extracted with four portions, each of 100 ml. of ether. The ethereal extracts were combined, washed with water, and dried over anhydrous magnesium sulfate. The dried solutions was filtered and the filtrate was evaporated to dryness. The residue (3 g.; M.P. 89 to 91° C.) was recrystallized from ethanol to give trans-2,5-dimethoxy-4′-aminostilbene in the form of a yellow crystalline solid having a melting point of 91° C. to 92° C. The infrared spectrum of this material ($CHCl_3$ solution) exhibited maxima at 2.75 and 2.95$\mu$ (—$NH_2$ stretching vibration), 6.18$\mu$ (C=C stretching vibration), and 10.35$\mu$ (=CH out of plane deformation).

Using the above procedure, but replacing trans-2,5-dimethoxy-4′-nitrostilbene by the corresponding cis-isomer (Ulrich et al., supra), there is obtained cis-2,5-dimethoxy-4′-aminostilbene.

(B) Trans-2,5-dimethoxy-4′-isocyanatostilbene

A total of 1800 ml. of phosgene was bubbled into 2800 ml. of chlorobenzene maintained at 3° C. to 5° C. The resulting solution was maintained at 0° C. to 2° C. with stirring while a solution of 10.0 g. of trans-2,5-dimethoxy-4′-aminostilbene (prepared as described above) in 75 ml. of chlorobenzene was added dropwise over a period of 15 minutes. When the addition was complete, the resulting mixture was heated at 90° C. to 95° C. for 1.5 hours. Infrared spectroscopic analysis of an aliquot of the resulting solution indicated the absence of —NH— and the appearance of a strong band for —NCO. The resulting solution was purged with nitrogen while heating at 60° C. to 70° C. for 2 hours to remove excess phosgene. The purged solution was distilled under reduced pressure to remove chlorobenzene. The residue was treated with ligroin and the yellow solid which separated was isolated by filtration, washed with ligroin and dried. There was thus obtained 10.1 g. of trans-2,5-dimethoxy-4′-isocyanatostilbene in the form of a yellow crystalline solid having a melting point of 68° C. to 70° C. Two grams of this material was dissolved in 15 ml. of hot ligroin-benzene (9:1 v./v.) and the solution separated from a small insoluble sticky residue. Upon cooling of the filtrate there separated 1.5 g. (75 percent recovery) of yellow needles having a melting point of 69.5 to 70.5° C. The infrared spectrum of this material ($CCl_4$ solution) exhibited maxima at 4.45$\mu$ (N=C=O stretching vibration), 6.12$\mu$ (C=C stretching vibration), and 10.35$\mu$ (=CH out of plane deformation).

Using the procedures set forth above, but replacing trans-2,5-dimethoxy-4′-isocyanatostilbene by cis-2,5-dimethoxy-4′-isocyanatostilbene (prepared as described in Example 1), there was obtained cis-2,5-dimethoxy-4′-isocyanatostilbene.

PREPARATION 2

(A) Cis-3,4,5-trimethoxy-4′-nitrostilbene

Following the procedure described by Ulrich et al., supra, for the preparation of cis-2,5-dimethoxy-4′-nitrostilbene, but replacing 2,5-dimethoxybenzaldehyde by 3,4,5-trimethoxybenzaldehyde, there is obtained cis-3,4,5-trimethoxy-4′-nitrostilbene.

(B) Cis-3,4,5-trimethoxy-4′-aminostilbene

Using the procedure described in preparation 1, part (A), but replacing trans-2,5-dimethoxy-4′-nitrostilbene by cis-3,4,5-trimethoxy-4′-nitrostilbene, there is obtained cis-3,4,5-trimethoxy-4′-aminostilbene.

Similarly, using the procedure described by Ulrich et al., supra, for the preparation of cis-2,5-dimethoxy-4′-nitrostilbene, but replacing 2,5 - dimethoxybenzaldehyde by 4-butoxybenzaldehyde,
2-butoxy-3-ethoxybenzaldehyde,
2,3-diethoxybenzaldehyde,
3,4-diisopropoxybenzaldehyde,
3,4-dimethoxybenzaldehyde,
4-ethoxy-2,6-dimethoxybenzaldehyde,
3-ethoxy-2-hexyloxybenzaldehyde,
3-ethoxy-2-pentyloxybenzaldehyde,
2-isobutoxy-3-methoxybenzaldehyde,
5-nitro-2-pentyloxybenzaldehyde, or
2,4,6-trimethoxybenzaldehyde, there are obtained:

cis-4-butoxy-4′-nitrostilbene,
cis-2-butoxy-3-ethoxy-4′-nitrostilbene,
cis-2,3-diethoxy-4′-nitrostilbene,
cis-3,4-diisopropoxy-4′-nitrostilbene,
cis-3,4-dimethoxy-4′-nitrostilbene,
cis-4-ethoxy-2,6-dimethoxy-4′-nitrostilbene,
cis-3-ethoxy-2-hexyloxy-4′-nitrostilbene,
cis-3-ethoxy-2-pentyloxy-4′-nitrostilbene,
cis-2-isobutoxy-3-methoxy-4′-nitrostilbene, and
cis-2,4,6-trimethoxy-4′-nitrostilbene, respectively.

The latter nitro compounds are then reduced, using the procedure described in preparation 1, part (A), to the corresponding amines, namely:

cis-4-butoxy-4′-aminostilbene,
cis-2-butoxy-3-ethoxy-4′-aminostilbene,
cis-2,3-diethoxy-4′-aminostilbene,
cis-3,4-diisopropoxy-4′-aminostilbene,
cis-3,4-dimethoxy-4′-aminostilbene,
cis-4-ethoxy-2,6-dimethoxy-4′-aminostilbene,
cis-3-ethoxy-2-hexyloxy-4′-aminostilbene,
cis-3-ethoxy-2-pentyloxy-4′-aminostilbene,
cis-2-isobutoxy-3-methoxy-4′-aminostilbene, and
cis-2,4,6-trimethoxy-4′-aminostilbene.

(C) Cis-3,4,5-trimethoxy-4′-isocyanatostilbene

Using the procedure described in preparation 1, part (B), but replacing trans-2,5-dimethoxy-4′-aminostilbene by cis-3,4,5-trimethoxy-4′-aminostilbene, there is obtained cis-3,4,5-trimethoxy-4′-isocyanatostilbene.

Similarly, using the procedure described in preparation 1, part (B), but replacing trans-2,5-dimethoxy-4′-aminostilbene by any of the amines listed in preparation 2, part (B), above there are obtained the corresponding isocyanates, namely:

cis-4-butoxy-4′-isocyanatostilbene,
cis-2-butoxy-3-ethoxy-4′-isocyanatostilbene,
cis-2,3-diethoxy-4′-isocyanatostilbene,
cis-3,4-diisopropoxy-4′-isocyanatostilbene,
cis-3,4-dimethoxy-4′-isocyanatostilbene,
cis-4-ethoxy-2,6-dimethoxy-4′-isocyanatostilbene,
cis-3-ethoxy-2-hexyloxy-4′-isocyanatostilbene,
cis-3-ethoxy-2-pentyloxy-4′-isocyanatostilbene,
cis-2-isobutoxy-3-methoxy-4′-isocyanatostilbene, and
cis-2,4,6-trimethoxy-4′-isocyanatostilbene.

PREPARATION 3

(A) Cis- and trans-2,5-dimethoxy-3′-nitrostilbene

Using the procedure described by Ulrich et al., supra, for the preparation of both cis- and trans-2,5-dimethoxy-4′-nitrostilbene, but replacing the 4-nitrophenylacetic acid used as starting material by 3-nitrophenylacetic acid, there are obtained the cis- and trans-isomers of 2,5-dimethoxy-3′-nitrostilbene.

(B) Cis- and trans-2,5-dimethoxy-3′-aminostilbene

Using the procedure described in preparation 1, part (A), but replacing the trans-2,5-dimethoxy-4′-nitrostilbene by the cis- and trans-isomers of 2,5-dimethoxy-3′-nitrostilbene, there are obtained the cis- and trans-isomers of 2,5-dimethoxy-3′-aminostilbene.

(C) Cis- and trans-2,5-dimethoxy-3′-isocyanatostilbene

Using the procedure described in preparation 1, part (A), but replacing trans-2,5-dimethoxy-4′-aminostilbene by the cis- and trans-isomers of 2,5-dimethoxy-3′-isocyanatostilbene, there are obtained the cis- and trans-isomers of 2,5-dimethoxy-3′-isocyanatostilbene.

PREPARATION 4

(A) Trans-2-methoxy-4-nitrostilbene

A mixture of 10.0 g. (0.073 mole) of o-methoxybenzaldehyde, 13.3 g. (0.073 mole) of p-nitrophenylacetic acid, 1.4 ml. of piperidine and 100 ml. of chlorobenzene was heated under reflux for 3 hours. At the end of this time the chlorobenzene was removed by distillation under reduced pressure. To the residue was added 50 ml. of piperidine and the resulting mixture was heated under reflux for one hour. At the end of this time the piperidine was removed by distillation under reduced pressure and the residue was treated with 50 ml. of ethanol. The yellow solid which separated was isolated by filtration, washed with ethanol and dried. There was thus obtained 9.0 g. of trans-2-methoxy-4′-nitrostilbene in the form of a yellow solid having a melting point of 122° C.

(B) Trans-2-methoxy-4′-aminostilbene

A solution of 6 g. of trans-2-methoxy-4′-nitrostilbene in 300 ml. of methanol was hydrogenated in the presence of 1 g. of Raney nickel. The initial pressure of hydrogen was 50 p.s.i. Hydrogenation was complete in 6 hours. At the end of this time the catalyst was removed by filtration and the filtrate was evaporated to dryness to leave 4.95 g. of trans-2-methoxy-4′-aminostilbene. This compound was recrystallized from isopropanol to give pale yellow needles of M.P. 68 to 70° C. A portion of this material was converted to the corresponding N-acetyl derivative, melting point 135° C. to 137° C., by treatment with excess acetic anhydride followed by addition of the reaction mixture to water.

Using the procedure described by Ulrich et al., supra, 2-methoxybenzaldehyde is condensed with 4-nitrophenyl acetic acid to obtain cis-2-methoxy-4′-nitrostilbene which is then hydrogenated using the procedure described in preparation 4, part (B), to obtain cis-2-methoxy-4′-aminostilbene.

(C) Trans-2-methoxy-4′-isocyanatostilbene

A total of 1000 ml. of phosgene was passed into 200 ml. of chlorobenzene maintained at 0° C. to 2° C. To the resulting mixture was added, over a period of 12 minutes, a solution of 6 g. of trans-2-methoxy-4′-aminostilbene in 100 ml. of chlorobenzene. The temperature of the reaction mixture was maintained between 1° C. and 4° C. during the addition. After the addition was complete the mixture was heated at 90° C. to 95° C. for 1.5 hours and thereafter was purged of phosgene by passage of nitrogen for 1.5 hours. The resulting purged mixture was filtered and evaporated to dryness under reduced pressure. The yellow crystalline residue which remained was washed with ligroin, isolated by filtration and dried. There was thus obtained trans-2-methoxy-4′-isocyanatostilbene in the form of a light brown liquid.

Similarly, using the above phosgenation procedure, but replacing trans-2-methoxy-4′-aminostilbene by cis-2-methoxy-4′-aminostilbene, there is obtained cis-2-methoxy-4′-isocyanatostilbene.

PREPARATION 5

(A) Trans-4-methoxy-4′-nitrostilbene

A mixture of 10 g. (0.073 mole) of p-methoxybenzaldehyde, 13.3 g. (0.073 mole) of p-nitrophenylacetic acid and 1.4 ml. of piperidine in 100 ml. of chlorobenzene was heated under reflux for 4 hours using a water trap. At the end of this time the solvent was removed by distillation under reduced pressure. The yellow solid which separated was isolated by filtration, washed with ethanol and dried. There was thus obtained 12 g. of trans-4-nitro-4′-methoxystilbene-α-carboxylic acid in the form of a crystalline solid having a melting point of 246° C. to 248° C. The acid so obtained was heated under reflux for 1.5 hours with 50 ml. of piperidine. The resulting solution was evaporated under reduced pressure and the residue was treated with ethanol. The solid was isolated by filtration, washed with ethanol and dried. There was thus obtained 3.3 g. of trans-4-methoxy-4′-nitrostilbene in the form of a crystalline solid having a melting point of 133° C. to 134° C. (Pfeiffer, Berichte, 48, 1793 gives melting point of 133° C. to 134° C. for this compound).

Similarly, trans-4-nitro-4′-methoxystilbene-α-carboxylic acid was prepared in accordance with the first part of the above procedure and was decarboxylated by adding it to a mixture of copper chromite and quinoline at 205° C. to 255° C. in accordance with the procedure of Ulrich et al., supra, to yield cis-4-methoxy-4′-nitrostilbene.

(B) Trans-4-methoxy-4′-aminostilbene

The trans-4-methoxy-4′-nitrostilbene obtained as described above was reduced using Raney nickel in accordance with the procedure described in preparation 4, part (B) above, to obtain trans-4-methoxy-4′-aminostilbene in the form of a crystalline solid which, after recrystallization from isopropanol, had a melting point of 170° C. to 171° C. (Pfeiffer, supra, gives a melting point of 173° C. to 174° C. for this compound).

Similarly, using the procedure described in preparation 4, part (B) above, but replacing trans-2-methoxy-4′-nitrostilbene by cis-4-methoxy-4′-nitrostilbene, there is obtained cis-4-methoxy-4′-aminostilbene.

(C) Trans-4-methoxy-4′-isocyanatostilbene

Using the procedure described in preparation 4, part (C), but replacing trans-2-methoxy-4′-aminostilbene by trans-4-methoxy - 4′ - aminostilbene, there was obtained trans-4-methoxy-4′-isocyanatostilbene in the form of a crystalline solid having a melting point of 63° C. to 166° C.

Similarly, using the procedure described in preparation 4, part (C), but replacing trans-2-methoxy-4′-aminostilbene by cis-4-methoxy-4′-aminostilbene, there is obtained cis-4-methoxy-4′-isocyanatostilbene.

EXAMPLE 1

Trans-N-acryloyl-2,5-dimethoxy-4′-aminostilbene

A solution of 1.6 ml. (0.20 mole) of acryloyl chloride in 25 ml. of benzene was added slowly, with stirring over a period of 30 minutes to a solution of 6.0 g. (0.027 mole) of trans-2,5-dimethoxy-4′-aminostilbene and 4 ml. of triethylamine in 50 ml. of benzene. After the addition was complete, the mixture was stirred for a further 1 hour and, thereafter, the solid which had separated was isolated by filtration and washed with benzene. The isolated solid was suspended in 200 ml. of water and the suspension was well stirred, then filtered and the insoluble material was washed on the filter with water. The washed solid (6.0 g.) was recrystallized from methanol to yield trans-N-acryloyl-2,5-dimethoxy-4′-aminostilbene as a pale yellow crystalline solid having a melting point of 177 to 180° C.

*Analysis.*—Calcd. for $C_{19}H_{19}NO_3$ (percent): C, 73.76; H, 6.19; N, 4.53. Found (percent): C, 73.62; H, 6.36; N, 4.44.

EXAMPLE 2

Poly(N-acryloyl-2,5-dimethoxy-4′-aminostilbene)

A mixture of 5 g. of N-acryloyl-2,5-dimethoxy-4′-aminostilbene in 15 g. of cyclohexanone was heated to 80° C. under an atmosphere of nitrogen until all the solid material had passed into solution. To the resulting solution was added a solution of 0.50 g. of azobis(isobutyronitrile) in 1 ml. of cyclohexanone. The resulting mixture exhibited an exotherm and, when the exotherm had subsided, the mixture was maintained at about 85° C. for a further 6 hours. The resulting mixture was cooled and 50 ml. of methanol was added. A resinous material separated and the supernatant liquor was decanted therefrom. The resin was washed and triturated with methanol until it was completely solidified at which time the material was crushed, washed with more methanol, and dried. There was thus obtained 3.5 g. of poly(N-acryloyl-2,5-dimethoxy-4′-aminostilbene) as a yellow solid having melting point over the range of 220–235° C.

EXAMPLE 3

2-methacryloyloxyethyl trans-2,5-dimethoxystilbene-4'-carbamate

A mixture of 4.63 g. (0.035 mole) of 2-hydroxyethyl methacrylate (previously redistilled) and 10 g. (0.035 mole) of trans-2,5-dimethoxy-4'-isocyanatostilbene in 120 ml. of toluene was heated under reflux and a few crystals of triethylene diamine were added. After heating the mixture under reflux for 2.25 hours it was found that an infrared spectrum of an aliquot showed no evidence of bands (4.4$\mu$) characteristic of the isocyanato group. Accordingly, the toluene was removed by distillation and the residue was recrystallized from methanol. There was thus obtained 2-methacryloyloxyethyl 2,5-dimethoxystilbene-4'-carbamate in the form of a yellow crystalline solid having a melting point of 122 to 125° C.

The above material was polymerized to yield poly(2-methacryloyloxyethyl 2,5 - dimethoxystilbene - 4' - carbamate) using the procedure described in Example 2.

EXAMPLE 4

N-($\alpha$-ethylacryloyl)-2,5-dimethoxy-4'-aminostilbene

Using the procedure described in Exmaple 1 but replacing acryloyl chloride by $\alpha$-ethylacryloyl chloride [derived by reaction of thionyl chloride wtih $\alpha$-ethylacrylic acid (Chemical Abstracts, 55, 3427i, 1961)], there was obtained N-($\alpha$-ethylacryloyl)-2,5-dimethoxy-4'-aminostilbene.

Similarly, using the procedure described in Example 1, but replacing acryloyl chloride by $\alpha$-methacryloyl chloride or $\alpha$-butylacryloyl chloride [derived by reaction of thionyl chloride with $\alpha$-butylacrylic acid, Chemical Abstracts, bid.], there were obtained N-($\alpha$-butylacryloyl)-2,5-dimethoxy-4'-aminostilbene and N-($\alpha$-butylacryloyl)-2,5-dimethoxy-4'-aminostilbene, respectively.

EXAMPLE 5

3-methacryloyloxypropyl trans-2,5-dimethoxystilbene-4'-carbamate

Using the procedure described in Example 3, but replacing 2-hydroxyethyl methacrylate by 3-hydroxypropyl methacrylate, there was obtained 3-methacryloyloxypropyl trans - 2,5 - dimethoxystilbene-4'-carbamate.

Similarly using the procedure described in Example 3, but replacing 2-hydroxyethyl acrylate by 3-hydroxyhexyl methacrylate, 4-hydroxybutyl acrylate, 2-hydroxyethyl $\alpha$-ethylacrylate, or 2-hydroxypropyl $\alpha$-butylacrylate, there were obtained 3-methacryloyloxyhexyl, 4-methacryloyloxybutyl, 2-($\alpha$-ethylacryloyl)oxyethyl and 2-($\alpha$-butylacryloyl)oxypropyl trans-2,5-dimethoxystilbene-4'-carbamate, respectively.

Each of the above named carbamates was polymerized using the procedure described in Example 2.

EXAMPLE 6

Cis-N-acryloyl-2,5-dimethoxy-4'-aminostilbene

Using the procedure described in Example 1, but replacing trans-2,5-dimethoxy-4'-aminostilbene by cis-2,5-dimethoxy-4'-aminostilbene, there was obtained cis-N-acryloyl-2,5-dimethoxy-4'-aminostilbene.

Similarly, using the procedure described in Example 1, but replacing the trans-2,5-dimethoxy-4'-aminostilbene there used by an equivalent amount of cis-3,4,5-trimethoxy-4'-aminostilbene,
cis-4-butoxy-4'-aminostilbene,
cis-2-butoxy-3-ethoxy-4'-aminostilbene,
cis-2,3-diethoxy-4'-aminostilbene,
cis-3,4-diisopropoxy-4'-aminostilbene,
cis-3,4-dimethoxy-4'-aminostilbene,
cis-4-ethoxy-2,6-dimethoxy-4'-aminostilbene,
cis-3-ethoxy-2-pentyloxy-4'-aminostilbene,
cis-2-isobutoxy-3-methoxy-4'-aminostilbene,
trans-2-methoxy-4'-aminostilbene,
trans-4-methoxy-4'-aminostilbene, and
cis-2,4,6-trimethoxy-4'-aminostilbene, there were obtained the corresponding N-acryloyl derivatives. The latter were polymerized using the procedure described in Example 2.

EXAMPLE 7

2-methacryloyloxyethyl cis-2,5-dimethoxystilbene-4'-carbamate

Using the procedure described in Example 3, but replacing trans-2,5-dimethoxy-4'-isocyanatostilbene by cis-2,5-dimethoxy-4'-isocyanatostilbene, there was obtained 2-methacryloyloxyethyl cis-2,5-dimethoxystilbene-4'-carbamate.

Similarly, using the procedure described in Example 1, but replacing the trans-2,5-dimethoxy-4'-isocyanatostilbene there used by an equivalent amount of cis-3,4,5-trimethoxy-4'-isocyanatostilbene,
cis-4-butoxy-4'-isocyanatostilbene,
cis-2-butoxy-3-ethoxy-4'-isocyanatostilbene,
cis-2,3-diethoxy-4'-isocyanatostilbene,
cis-3,4-diisopropoxy-4'-isocyanatostilbene,
cis-3,4-dimethoxy-4'-isocyanatostilbene,
cis-4-ethoxy-2,6-dimethoxy-4'-isocyanatostilbene,
cis-3-ethoxy-2-pentyloxy-4'-isocyanatostilbene,
cis-2-isobutoxy-3-methoxy-4'-isocyanatostilbene,
trans-2-methoxy-4'-isocyanatostilbene,
trans-4-methoxy-4'-isocyanatostilbene, and
cis-2,4,6-trimethoxy-4'-isocyanatostilbene, there were obtained the corresponding 2-methacryloyloxyethyl carbamates.

What is claimed is:

1. A monomer having the formula:

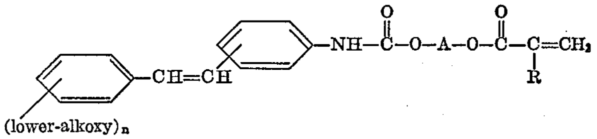

wherein $n$ is an integer from 1 to 3, A is lower-alkylene and R is selected from the class consisting of hydrogen and lower-alkyl.

2. 2-methacryloyloxyethyl 2,5-dimethoxystilbene-4'-carbamate.

References Cited

UNITED STATES PATENTS 3,555,071 1/1971 Rao et al. ............ 260—453

JAMES A. PATTEN, Primary Examiner

M. L. SHIPPEN, Assistant Examiner

UNITED STATES PATENT OFFICE
CERTIFICATE OF CORRECTION

Patent No. 3,796,744 Dated March 12, 1974

Inventor(s) Durvasula V. Rao, Henri Ulrich, Fred A. Stuber and Adnan A. R. Sayigh It is certified that error appears in the above-identified patent and that said Letters Patent are hereby corrected as shown below:

Column 3, line 32:

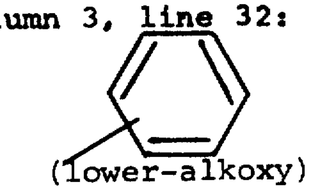

Should read:

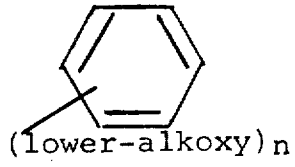

Column 4, line 44:

Preceding the formula:

Should read:

The nitrostilbenes which are employed in the preparation of the aminostilbenes (II) using the above reduction procedures can be represented by the formula:

Column 4, line 68:

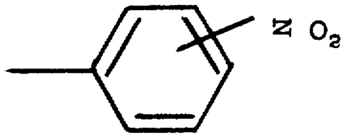

Should read:

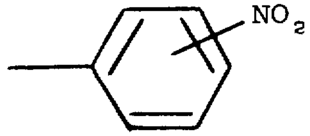

Column 10, line 29:

point of 63°C

Should read:

point of 163°C

Column 11, line 34: ,bid]

Should read: ,ibid]

Column 11, line 34:
N-(α-butylacryloyl)-

Should read:
N-(α-methacryloyl)-

Signed and sealed this 5th day of November 1974.

(SEAL)
Attest:

McCOY M. GIBSON JR.
Attesting Officer

C. MARSHALL DANN
Commissioner of Patents